United States Patent [19]
Dietz et al.

[11] Patent Number: 5,213,240
[45] Date of Patent: May 25, 1993

[54] MAGNETIC TOOL HOLDER

[75] Inventors: Hugh H. Dietz; Alfred G. Tienken; Leonard A. Dems, all of Syracuse; James D. Haskins, Minoa; Richard F. Raymond, Camillus, all of N.Y.

[73] Assignee: H. Dietz & Company, Inc., Syracuse, N.Y.

[21] Appl. No.: 696,244

[22] Filed: May 6, 1991

[51] Int. Cl.$^5$ .............................................. A45F 5/00
[52] U.S. Cl. ................................. 224/183; 224/252; 224/904; 24/303; 335/285; 248/309.4
[58] Field of Search ............... 224/183, 252, 253, 904; 211/DIG. 1; 248/683, 467, 537, 206.5, 309.4; 268/8; 403/DIG. 1; 24/303; 292/251.5; 335/302, 285

[56]  References Cited
U.S. PATENT DOCUMENTS
5,025,966  6/1991  Potter .................................. 224/183

Primary Examiner—Linda J. Sholl
Attorney, Agent, or Firm—Wall and Roehrig

[57]  ABSTRACT

An improved magnetic tool holder for tape measures is provided in which a spoked keeper plate is mounted on the tool to be held in the tool holder. This results in a uniform holding force around the circumference of the holder so that the tool can be securely held in the receptacle and can be readily and easily removed by application of a controlled force. The holding force can be varied by varying the number of spokes and the width of the spokes. A self-centering ring and receptacle is provided to produce an audible click when the tool is properly seated with the keeper plate in intimate contact with the magnet and pole piece.

22 Claims, 1 Drawing Sheet

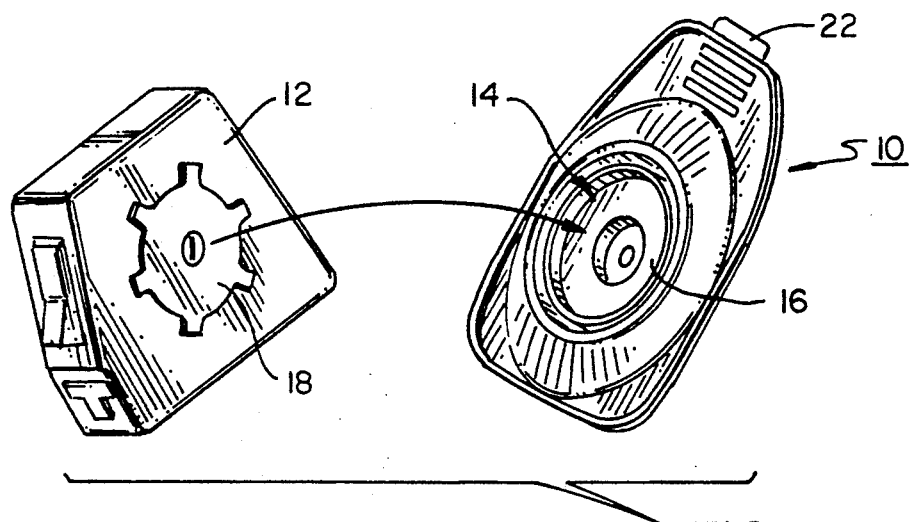
FIG. 1
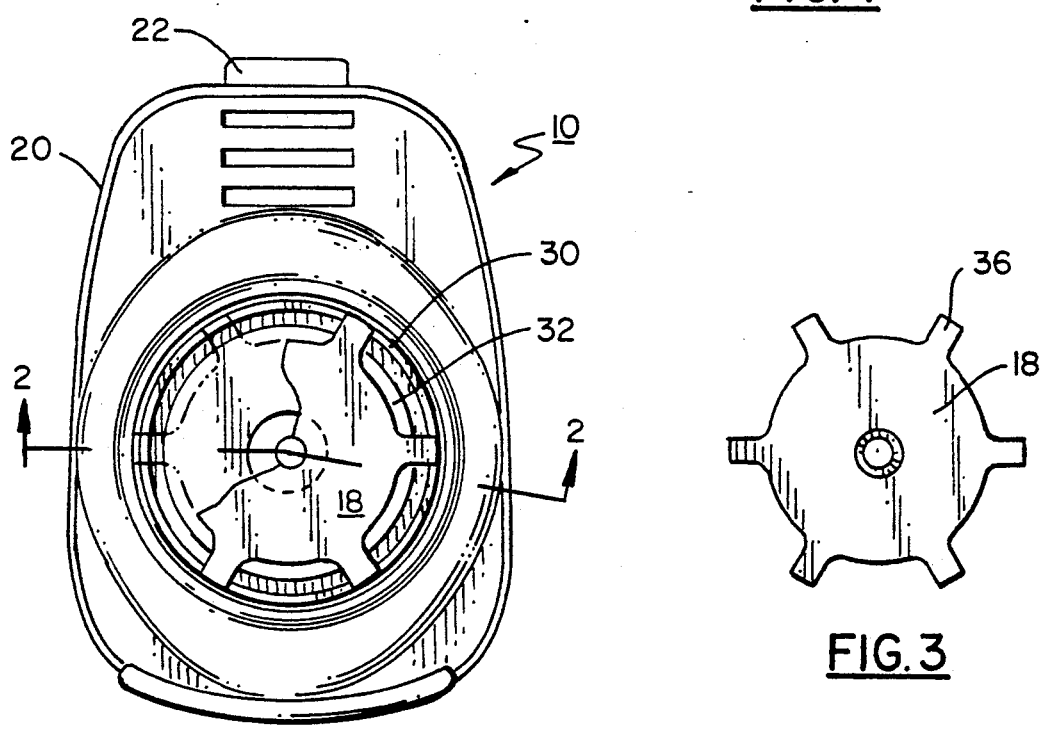
FIG. 4
FIG. 3
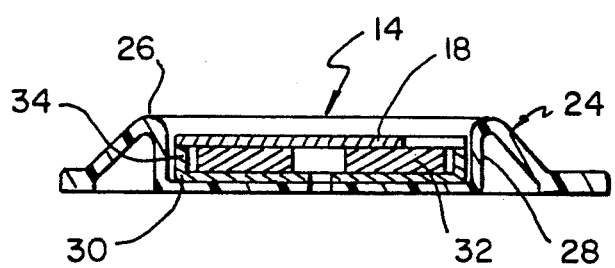
FIG. 2

MAGNETIC TOOL HOLDER

This invention relates to a magnetic tool holder for tape measures and the like, and more particularly to an improved magnetic tape holder in which the holding force is carefully controlled and the proper seating of the tool in the holder is clearly indicated.

BACKGROUND OF THE INVENTION

It has been common practice for many years now to make a tape measure by forming a narrow strip of flexible material, usually metal marked with units of length into a coil and housing it in a generally rectangular container from which the tape can be withdrawn and retracted for use.

Various devices have been used over the years to secure the tape measure when not in use to the clothing of the user, such as belt clips and various types of hooks or the like. With most prior art devices, it has often been necessary to use both hands to clip a tape measure to the belt or pocket or to secure it on a hook or other attachment and it has frequently resulted in the tape measure not being replaced in its proper storage holder, but merely laid on a work bench where it can easily be knocked on the floor or become covered with other work.

Recently, a magnetic tool holder for a tape measure has been developed which is shown in U.S. patent application Ser. No. 519,586, filed May 7, 1990 now U.S. Pat. No. 5,025,966 issued Jun. 25, 1991. in which a belt mountable body has a magnet mounted in a self-centering receptacle and the tape to be mounted thereon has a metallic keeper mounted on the tool so as to mate with the magnet on the body of the magnetic tool holder. The apparatus shown in said patent application has proven very satisfactory for certain applications, however in others it has been found that the holding power has not been uniform and that the centering action has not been positive enough to ensure that the tool is safely held in the holder under all conditions. In use it is very important that an object such as a twenty-five foot tape measure be securely held to the mounting holder so that it cannot be accidentally knocked loose from the belt of the user.

Similarly, while it can sometimes be arranged to have a very strong holding force, if the force is too great, it then becomes next to impossible to remove the tape measure from the belt without either breaking the belt or the mounting holder and this, again, makes the device very impracticable and unusable.

OBJECTS AND SUMMARY OF THE INVENTION

Accordingly, it is an object of the present invention to provide a magnetic tool holder for a tape measure that provides a safe and secure mounting for a tape measure on a belt or the like.

It is another object of the present invention to provide a magnetic tool holder for a tape measure that securely and accurately positions the tool in a centrally aligned orientation so that the desired magnetic holding power can be fully developed to hold the tool securely in place.

It is a further object of the present invention to provide a magnetic tool holder for a tape measure that positively and securely holds the tape measure in place on the holder body mounted on a user's belt, but which also permits easy removal for use.

It is still a further object of the present invention to provide a keeper plate for securing a tape measure in a magnetic tool holder that can be simply and easily configured to a specific holding power.

It is yet another object of the present invention to provide a keeper plate for securing a tool in a magnetic tool holder which can be varied to provide enough holding power to securely hold a tool in a tool holder and yet permit release of the tool from the tool holder upon application of a predetermined amount of force.

It is a further object of the present invention to provide a magnetic tool holder and keeper plate that allows the tool to be "peeled" from the holder with a minimum amount of force while providing a generally larger amount of holding power against accidental dislodgement from the tool holder.

It is a still further object of the present invention to provide a means for positively indicating the secure and proper seating of the tool in the tool holder.

It is a further object of the present invention to provide a means for providing an audible signal that the tool is properly seated in its holder.

In one embodiment this is accomplished by providing an annular keeper plate having a plurality of spokes about the circumference thereof with the number of spokes and the width of the spokes determining the holding power for that particular keeper plate. The tool holder is configured with an annular ring for guiding the tool to be mounted therein into proper position. The height of the ring is chosen so as to provide not only a guiding and centering action, but to also have a vertical wall cavity configuration that allows the tool to be mounted in the holder to snap into position into firm magnetic contact with the magnet unit when the tape measure is allowed to slide over the centering annular ring nose and to then drop into the mounting cavity. This dropping action causes an audible click or snap as the keeper plate contacts the magnet pole piece to secure the tape measure in fully seated position within the tool holder.

BRIEF DESCRIPTION OF THE DRAWINGS

These and other and further objects of the present invention will be apparent from the following detailed description of the invention which is shown in the accompanying drawings, in which:

FIG. 1 is a perspective view of a tape holder with the tape measure removed therefrom;

FIG. 2 is a cross-sectional view on line 2—2 of FIG. 4;

FIG. 3 is a plan view of a keeper plate according to the present invention; and

FIG. 4 is a plan view of the keeper plate of FIG. 3, installed on the holder of FIG. 1.

DETAILED DESCRIPTION OF A PREFERRED EMBODIMENT

Referring now to FIG. 1, there is shown in perspective view the tool holder 10 which is adapted to receive thereon a tape measure 12 in a receptacle 14 on the holder 10. Located in receptacle 14 is an annular magnet 16 for securely engaging the keeper plate 18 which is mounted on tape 12.

The body 20 of the tool holder 10 is of a generally rectangular configuration and carries on one side thereof a spring clip 22 adapted to engage over a belt or pocket of a user to hold the tool holder 10 in position for mounting of the tape measure. The body 20 of the tool holder can be made of injection molded plastic or other material as desired. As may be seen in FIG. 2, the body 20 has an annular receptacle area 14 which is formed by a ramped annular ring 24 which projects outwardly from the top plane of the body 20 to a rounded nose portion 26 and then abruptly drops back to below the plane of the body in almost a perpendicular fashion so that the wall portion 28 is basically at right angles to the plane of the tool holder. Mounted within the receptacle portion 14 is a magnet pole piece 30 of ferromagnetic material which is sized very slightly smaller than the inside diameter of the annular ring 24 at the wall section 28. This pole piece forms in effect an annular cup in which is mounted a magnet 32. The annular magnet 32 is cemented to the cup 30 and the cup 30 is riveted or cemented to the clip body 20 to securely position them within the receptacle 14 of the body. The magnet 32 is an annular magnet of any suitable magnetizable material and has an outside diameter approximately one-quarter of an inch smaller than the inside diameter of the pole piece 30. A magnetic gap is thereby created between the outer circumference of the magnet 32 and the vertical side 34 of the pole piece 30.

Referring now to FIG. 3, the keeper 18 is shown in detail as a flat plate of ferromagnetic material having six equally spaced tabs 36 formed about the circumference of the body of the keeper 18. The body of the keeper 18 is generally circular in configuration and has a diameter less than the diameter of the magnet 32. A half inch smaller diameter is shown as a desired size. The tabs 36 extend outwardly on diameters for approximately one-quarter of an inch each so that the outside diameter of the tabs is substantially the same as the outside diameter of the pole piece 30. Thus, as seen in FIG. 4, when the keeper 18 is positioned in the receptacle 14, the outside diameter of the tabs will comfortably fit within the vertical walls 28 of the ring 24 and self-center within the ring 24 so that each tab 36 bridges the magnetic gap between the vertical side of the pole piece 34 and the adjacent edge of the magnet 32. The tabs thus complete the magnetic circuit through the pole piece and magnet to securely hold the keeper plate in position on the magnet within the receptacle 14. Keeper 18 is shown in the preferred embodiment as a circular body with radial tabs. In other embodiments the keeper body can be of any desired polygonal shape with an appropriate number of tabs extending outwardly from the body to complete the magnetic circuit and yield the desired holding power.

The width of the tabs is chosen so as to provide the desired amount of holding force for the tool to be mounted on the tool holder 10 and yet allow easy "peeling" of the tool from the holder without pulling the entire assembly off the wearer's belt. With the tabs having a diameter substantially equal to the diameter of the cup-shaped pole piece 30, the keeper plate 18 is centered upon the magnet 32 and the holding force is equally distributed about the circumference of the pole piece, through each tab, so that essentially an equal force is required to remove the tool from the tool holder regardless of from which point on the circumference the force is applied. With prior art devices having a solid circular keeper of a diameter substantially less than that of the magnet cup, the keeper could be offset in one direction or the other so that from one direction the holding would be excessive and from another insufficient. This non uniform holding force has caused problems with certain prior art devices which the present configuration readily overcomes. While I have shown a tab configuration having six tabs, obviously other numbers of tabs could be used. Also, the width of the tabs as indicated can be varied along with the number of tabs to provide the desired holding force.

The keeper 18 is mounted on the tape measure 12 by cement or other means to permit the tape measure to be securely mounted in the tool holder 10. The keeper plate is spaced from the tape 12 by the cement or the mounting means a distance sufficient such that when the keeper plate, is securely seated in contact with the magnet 32 and pole piece 30, the tape housing itself just clears the nose 26 of the annular ring 24 on the body of the tool holder 10. It should be apparent that while we have shown the keeper as a plate having radial tabs mounted on a tool, the function of the keeper plate can be performed by various equivalent constructions. If the tool to be mounted or its case is made of magnetic material, a raised boss, ring or cross, for instance, can be formed therein so as to cooperate with the magnet 32 to hold the tool in place. If the tool or case is non magnetic, a ring or series of tabs of ferromagnetic material can be embedded or affixed to the plastic so as to cooperate with the magnet and hold the tool to be mounted in place. Thus, keeper 18 can be any ferromagnetic material means positioned on either the holder or tool so as to complete the magnetic circuit of the magnet mounted on the other part and thereby securely holding the two together In addition to the uniform holding as described above, the configuration shown in the drawings has an additional advantage in that the proper seating of the keeper 18 in the receptacle 14 is generally indicated by a loud "snap" or "click" as the keeper is pulled into contact with the pole piece 30 and the magnet 32. This is accomplished by the annular ring 24 having a radiused nose section 26 which acts as a centering guide for locating the keeper plate within the receptacle and then the vertical wall section 28 which once the keeper plate is cleared over the nose 26, allows it to fall directly into the receptacle 14 and bottom out on the magnet. Since once the keeper plate slides off the nose portion 26, it is being rapidly pulled by the magnetic force of the magnet 30, it snaps into position with a "click" or "snap" that can be easily heard by the user. If the user hears this snap or click, it is a clear indication that the tool has properly seated in the holder and will not be easily dislodged. The combination of the annular ring 24 with the radiused centering guide nose 26 and the vertical walls 28 which have an inside diameter slightly greater than the circumference of the tabs 36 permits this self-locating and automatic seating function of the tool in the tool holder.

Some prior art devices have had this ring 24 being a tapered ring both inside and outside, such as shown on the outside in FIG. 2. This has allowed the keeper plate to hang up to a degree in an off-center position such that the tool is not properly seated home on the magnet and it can be inadvertently displaced from the tool holder.

It thus will be seen that we have provided a secure tool holder in which the tape can be simply and easily located in the tool holder and an audible indication is produced to indicate proper seating of the tool in the tool holder so that it cannot be accidentally dislodged. We also have provided a method and means for simply and easily varying the holding force in proportion to the weight of the tool to be mounted in the holder by simply using a different pole piece with wider or more numerous tabs. Thus, the basic body 20 of the tool holder 10 can be used to accommodate a variety of tools having different weights and sizes by merely varying the keeper 18, which is mounted on the tool to be held in the tool holder.

While this invention has been explained with reference to the structure disclosed herein, it is not confined to the details set forth and this application is intended to cover any modifications and changes as may come within the scope of the following claims:

What is claimed is:

1. A magnetic tool holder for securing a tool to the belt of a user which comprises:
   a body member and a tool member;
   a magnet and a magnetic pole piece;
   a keeper member sized for cooperative engagement with said magnet and pole piece;
   a receptacle member for receiving said magnet and magnetic pole piece or keeper member therein, having a complementary size and shape for close sliding fit with said magnet and pole piece or keeper member;
   said receptacle member being located on said body member or tool member;
   said magnet and pole piece or keeper member not positioned in said receptacle member being mounted on the other one of said body or tool members from that on which said receptacle is located;
   a plurality of spaced apart tabs of ferromagnetic material extending outwardly from said keeper member;
   said keeper member tabs being formed to complete a magnetic circuit with said magnet and pole piece when positioned in magnetic engagement therewith;
   so that said tool member will be releasably secured in said tool holder by said magnet and keeper.

2. A magnetic tool holder according to claim 1 further including said receptacle and magnet being annular; and
   said keeper means comprising a flat plate having a circular body and a plurality of radial tabs disposed about the circumference.

3. A tool holder according to claim 2 further including a cup shaped magnet pole piece sized to receive therein said annular magnet for mounting together on either said body or tool to be mounted in the holder.

4. A tool holder according to claim 3 wherein said pole piece has a diameter less than the inside diameter of the receptacle and is mounted in said annular receptacle; and
   said keeper plate is mounted on the tool to be mounted in the holder.

5. A tool holder according to claim 3 wherein the diameter of the radial tabs substantially equals the diameter of said cup shaped magnet pole piece.

6. A tool holder according to claim 5 wherein said plurality of radial tabs comprises six tabs equally spaced about the circumference of the keeper plate body so as to provide a uniform holding force thereabout.

7. A tool holder according to claim 2 wherein the width of said radial tabs is varied in proportion to the holding power needed to securely hold the tool to be mounted in the tool holder.

8. A tool holder according to claim 7 wherein the number of radial tabs is varied to provide the desired holding power.

9. A magnetic tool holder according to claim 1 wherein said keeper is formed as an integral portion of the tool to be mounted in said holder.

10. A magnetic tool holder for releasably securing a tool to an object comprising:
    a body member and a tool member;
    a magnet;
    a keeper member sized for operative magnetic engagement with said magnet;
    a receptacle member for receiving said magnet or keeper member therein, having a complementary size and shape for close sliding fit with said magnet or keeper member;
    said receptacle member being located on said body member or tool member;
    said magnet or keeper member not positioned in said receptacle member being mounted on the other one of said body or tool member from that on which said receptacle is located;
    said receptacle having a vertical side wall relative to the plane of said body member;
    said vertical side wall having a height greater than the thickness of said magnet and pole piece or keeper plate; and
    guide means positioned about said receptacle side wall in operative relation thereto;
    so that said tool member when operatively engaged with said guide means will be aligned with said receptacle and drop vertically into said receptacle until said magnet and keeper member are magnetically engaged with an audible click.

11. A tool holder according to claim 10 further including a cup shaped pole piece sized to receive therein said magnet for mounting together on either said body or tool to be mounted in the holder.

12. A tool holder according to claim 11 wherein said receptacle is annular, said pole piece and magnet are mounted in said annular receptacle and said keeper means is mounted on the tool to be positioned in the tool holder.

13. A tool holder according to claim 12 wherein said pole piece has a diameter less than the inside diameter of the receptacle vertical side wall and said keeper means is a circular plate and has an effective diameter substantially equal to the diameter of the pole piece.

14. A tool holder according to claim 13 wherein the depth of said annular receptacle together with the height of said guiding portion is less than the cumulative thickness of said keeper plate, magnet, magnet pole piece, and the mounting means therefore so that the tool to be mounted contacts the holder only at the keeper plate and magnet pole piece interface.

15. A tool holder according to claim 13 wherein said keeper plate comprises a circular body having a plurality of radial tabs extending therefrom with the diameter of the tabs being the effective diameter of said keeper plate.

16. A magnetic tool holder according to claim 10 wherein said receptacle and guide means comprise a unitary structure for guiding and aligning a tool member into operative magnetic engagement of said keeper and magnet in said holder.

17. The method of varying the holding power of a magnetic tool holder for securing different size and weight tools to a tool holder on a user's belt which comprises the steps of:
  forming a holding magnet and pole piece with a selected magnetic gap;
  forming a keeper plate body with a plurality of tabs extending therefrom;
  sizing said keeper plate so that only said extending tabs bridge the selected magnetic gap of the holding magnet and pole piece;
  varying the physical parameter of said tabs to provide holding power corresponding to the size and weight of the tool to be positioned in the tool holder.

18. The method of claim 17 further including varying the number of radial tabs around the keeper plate to varying the holding power of the holding magnet.

19. The method of claim 18 further including centering and aligning the keeper plate tabs with the magnet gap of the holding magnet to provide a uniformly distributed holding power about the circumference of the holding magnet.

20. A magnetic tool holder according to claim 17 wherein varying the physical parameter of said tabs comprises varying the width of said tabs.

21. A magnetic tool holder according to claim 17 wherein varying the physical parameters of said tabs comprises varying the thickness of said plurality of tabs.

22. The method of claim 17 wherein said magnet, pole piece and keeper plate are circular.

* * * * *